(12) United States Patent
Vempati et al.

(10) Patent No.: US 9,471,595 B1
(45) Date of Patent: Oct. 18, 2016

(54) RECOVERING FILE MAPPING INFORMATION IN FILE SYSTEMS

(71) Applicant: EMC Corporation, Hopkinton, MA (US)

(72) Inventors: Srinivasa Rao Vempati, Upton, MA (US); Jean-Pierre Bono, Westborough, MA (US); Michael D. Schouten, Lake Katrine, NY (US); Feng Zhang, Shanghai (CN); Praveen S. Solanki, Brighton, MA (US)

(73) Assignee: EMC Corporation, Hopkinton, MA (US)

( * ) Notice: Subject to any disclaimer, the term of this patent is extended or adjusted under 35 U.S.C. 154(b) by 222 days.

(21) Appl. No.: 14/042,511

(22) Filed: Sep. 30, 2013

(51) Int. Cl.
*G06F 7/02* (2006.01)
*G06F 17/30* (2006.01)
*G06F 12/00* (2006.01)
*G06F 3/06* (2006.01)

(52) U.S. Cl.
CPC ....... *G06F 17/30221* (2013.01); *G06F 3/0619* (2013.01); *G06F 12/00* (2013.01); *G06F 17/30067* (2013.01); *G06F 17/30091* (2013.01)

(58) Field of Classification Search
CPC ........... G06F 3/0619; G06F 17/30091; G06F 12/00; G06F 17/30371; G06F 3/0643; G06F 17/30067
See application file for complete search history.

(56) References Cited

U.S. PATENT DOCUMENTS

| | | | | |
|---|---|---|---|---|
| 5,875,444 | A * | 2/1999 | Hughes | G06F 11/1435 |
| 7,650,341 | B1 * | 1/2010 | Oratovsky et al. | 707/999.01 |
| 7,899,795 | B1 * | 3/2011 | Kahn | G06F 11/0727 707/690 |
| 8,478,799 | B2 * | 7/2013 | Beaverson | G06F 17/30097 707/823 |
| 8,612,382 | B1 * | 12/2013 | Patel | G06F 11/0727 707/609 |
| 2007/0067256 | A1 * | 3/2007 | Zayas et al. | 707/1 |
| 2007/0124341 | A1 * | 5/2007 | Lango | G06F 17/30067 |
| 2012/0095971 | A1 * | 4/2012 | Shyam | G06F 17/30171 707/690 |

* cited by examiner

Primary Examiner — Bruce Moser
(74) Attorney, Agent, or Firm — Krishnendu Gupta; Jason A. Reyes; Deepika Bhayana

(57) ABSTRACT

A method is used in recovering file mapping information in file systems. Metadata of a file of a file system is evaluated. Mapping information associating the file to a file system hierarchy of the file system is missing a reference to an inode of the file. Based on the evaluation, the mapping information is updated for including the file to the file system hierarchy of the file system.

16 Claims, 12 Drawing Sheets

RECOVERING FILE MAPPING INFORMATION IN FILE SYSTEMS

BACKGROUND

1. Technical Field

This application relates to recovering file mapping information in file systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

A file system checking (FSCK) utility provides a mechanism to help detect and fix inconsistencies in a file system. The FSCK utility verifies the integrity of the file system and optionally repairs the file system. In general, the primary function of the FSCK utility is to help maintain the integrity of the file system. The FSCK utility verifies the metadata of a file system, recovers inconsistent metadata to a consistent state and thus restores the integrity of the file system.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

SUMMARY OF THE INVENTION

A method is used in recovering file mapping information in file systems. Metadata of a file of a file system is evaluated. Mapping information associating the file to a file system hierarchy of the file system is missing a reference to an inode of the file. Based on the evaluation, the mapping information is updated for including the file to the file system hierarchy of the file system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
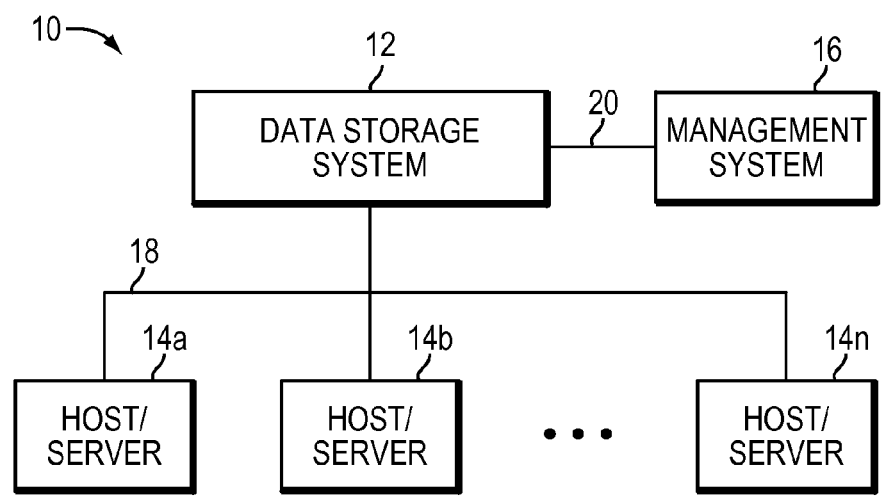
FIGS. 1-3 are examples of an embodiment of a computer system that may utilize the techniques described herein.

Described below is a technique for use in recovering file mapping information in file systems, which technique may be used to provide, among other things, evaluating metadata of a file of a file system, where mapping information associating the file to a file system hierarchy of the file system is missing a reference to an inode of the file, and based on the evaluation, updating the mapping information for including the file to the file system hierarchy of the file system.

Generally, files are grouped together in a file system including a hierarchy of directories and optionally subdirectories. Each file of the file system is specified by an alphanumeric pathname through the hierarchy. The pathname includes the name of each directory along a path from the top of the hierarchy down to the directory that includes the file. To locate the file, the user or application program specifies the pathname for the file. Further, the top of the file system hierarchy of a file system is also referred to as the root directory.

In general, a directory entry for a file is called a hard link to that file. When a file system supports multiple hard links, any file may have one or more hard links to it, either in the same or in different directories. Thus a file is not bound to a single directory and does not have a unique name. In other words, the file name is not an attribute of the file. Instead, in a file system, a file may uniquely be specified by its inode number and its device ID, which are attributes of the file. To support multiple hard links, the file has an attribute called a link count, specifying the number of hard links to the file. The file continues to exist as long as its link count is greater than zero. The hard links to the file are equal in all ways and are simply different names for the same file. The file may be accessed through any of its hard links, and there is no way to tell which is the original hard link. To support multiple links, a file's inode may include multiple parent directory inode identifiers in the parent information. An inode parent information may also indicate the current number of links to the associated file if it is desired to be able to return all pathnames to the file.

As described above herein, a file system includes a hierarchy of directories and regular files that are not directories. The directories contain records of hard links to the regular files. There are multiple hard links to each of some of the regular files, so that each of some of the regular files has multiple hard links. Each of the hard links includes a respective file name. A data storage system may store a hard link database. The hard link database includes hard link database files. There is a one-to-one correspondence between each of the regular files having multiple hard links and each of the hard link database files. Each of the hard link database files stores one or more records of addressing information for addressing one or more of the hard links to the corresponding one of the regular files having multiple hard links.

Generally, a hard link database is built on an existing file system management infrastructure so as to exploit file system recovery capabilities (such as the "FSCK" utility) in case of a system crash, and the hard link database maintenance and search routines are designed with little modification to file system manager routines so that the hard link database is portable with the file system during replication or migration or upgrade to future file system versions. These objectives are met by providing each regular file having multiple hard links with a corresponding hard link database file containing records addressing hard links to the regular file, so that there is a one-to-one correspondence between each regular file having multiple hard links and a corresponding one of the hard link data base files. Therefore there are as many corresponding hard link data base files as there are regular files having multiple links. The corresponding hard link database files will be referred to as "HLDB" files.

Generally, files in a data storage system are organized as a hierarchy of file system blocks including inodes, indirect blocks, and data blocks. The hierarchy of file system blocks includes a parent-child block relationship between a parent object that points to a child object. Generally, a file is associated with an inode such that the inode of a file includes metadata that provides a mapping to convert a file system block number of a data block to its corresponding logical block number. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship.

The loss or corruption of any of numerous types of metadata of a file system as described above herein can result in inconsistencies or corruption of a file system. For example, assume that metadata within one or more cylinders that keeps track of which blocks of storage or inodes are free and which are allocated is corrupted or lost. Without such metadata, the file system is unable to write additional files, as a determination needs to be made to identify a free inode structure and a sufficient number of free data blocks. As another example, if the metadata for a particular inode is lost or corrupted, it may not be possible to access the corresponding file. As yet a further example, metadata in the file system may be corrupted so that a path to a file from the root directory of a file system cannot be traced. Thus, a path to a file from the root directory of a file system may be broken indicating a missing reference within the path in any one of numerous ways. One such way is that metadata of a directory pointing to a file is corrupted in such a way that the link from the directory to the file is missing. Further, another such way is that the inode of a directory is corrupted in such a way that respective links to files pointed to by the directory are missing. It should be appreciated that such corruptions or inconsistencies may develop in any one of numerous ways, including hardware failures, software bugs, and so on. In addition, it should be appreciated that the types of inconsistencies and problems with the file systems mentioned above are described merely for illustrative purposes, and that numerous other types of inconsistencies or problems are possible.

File System Checking (FSCK) is a process by which a data storage system verifies integrity of a file system and optionally repairs any inconsistencies found during verification of the file system. In at least some systems, a FSCK utility verifies the metadata of a file system, recovers inconsistent metadata to a consistent state and thus restores the integrity of the file system. To verify the metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory. Additionally, the FSCK utility uses the stored information to restore the integrity of the file system by fixing inconsistencies found during validation of metadata.

Further, the FSCK utility executes in one or more phases. The first phase of the FSCK utility gathers information regarding allocated inodes within a file system. During the first phase, the FSCK utility iterates over a file system hierarchy of each allocated inode of a file system and validates a path to each allocated inode from the root directory as part of a name space check when recovering the file system. During the name space check, if an inode of a file of a file system cannot be reached from the root directory of the file system by using any one of paths to the file indicating that every hard link to the file has been lost or corrupted, the inode of the file is referred to as an orphan inode indicated by a missing reference to the inode of the file. Thus, if a file can be reachable by multiple paths and every path to the file is lost or corrupted, the file is considered a lost file and the inode of the lost file is referred to as an orphan inode.

Conventionally, upon detecting an orphan inode in a file system hierarchy of a file system, the conventional FSCK utility moves the file associated with the orphan inode to a special directory in the file system (e.g., a lost+found directory). Further, in such a conventional system, when a reference to the inode of a file is missing from a parent directory of the file, the path to the file is considered a broken path thereby resulting in loss of the name for the file name because the name for the file is stored in the parent directory. Thus, in such a conventional system, a file with a missing reference is renamed using a set of characters which includes the inode number. Thus, in such a conventional system, when a file of a file system with a missing reference is moved to the lost+found directory of the file system, the name of the file is updated to a set of characters that a user is unable to recognize. As a result, in such a conventional system, a user has to evaluate contents of each file residing in the lost+found directory of a file system in order to find a specific file. Further, in such a conventional system, only a system administrator can generally access the lost+found directory and is responsible for providing lost files to a user. Further, in such a conventional system, if the lost+found directory of a file system includes a large number of files (such as hundreds or thousands of files) due to a significant amount corruption in the file system, it is difficult or impossible for a system administrator to manually evaluate contents of each file that has been moved to the lost+found directory by the FSCK utility and distribute such files to appropriate users and directories. Consequently, in such a conventional system, if a user is unable to find a specific file from a large number of files that have moved to the lost+found directory of a file system, the user may lose a large portion of enterprise data thereby causing a data loss or unavailability of the enterprise data.

Generally, a directory may be associated with access control permissions (also referred to herein as "ACL") such that files residing within that directory inherits the access control permissions from the directory. In a conventional system, when a parent directory inode of a file is corrupted, it may be difficult or impossible to locate access control permissions associated with the corrupted parent directory entry. Thus, in such a conventional system, when the conventional FSCK utility moves a file to the lost+found directory of the file system upon detecting that no valid path to the file from the parent directory exists, the file also loses access control permissions associated with the parent directory. Thus, in such a conventional system, a user who may not have a permission to access files of such parent directory, the user may end up accessing the file when the file is moved to the lost+found directory of a file system thereby compromising security of the parent directory.

By contrast, in at least some implementations in accordance with the technique as described herein, a FSCK utility using the current technique maps (also referred to herein as "reconnects") an orphan inode of a file that has been missing a reference from a parent directory back to the parent directory due to corruption of metadata of the parent directory by using parent inode information included in the orphan inode of the file. Further, in at least one embodiment of the current technique, a FSCK utility using the current technique may reconnect a broken hard link for a file back to the parent directory of the file by evaluating information stored in an hard link database. As a result, in such a case, when the FSCK utility using the current technique finishes recovering files with missing references, the files are moved to respective parent directories thereby placing the files back to respective valid locations within a file system hierarchy. Thus, in at least one embodiment of the current technique, the FSCK utility reestablishes a path to a file upon detecting that the path has been broken due to metadata corruption in a parent directory by reconnecting the file to the parent directory of the file. In such a case, even though the FSCK utility is unable to restore the name of a file which has been moved back to its valid location within a file system hierarchy, the user is able to efficiently evaluate the file in order to determine contents of the file as the user does not have to search for the file in the lost+found directory.

In at least some implementations in accordance with the technique as described herein, the use of the recovering file system mapping information in file systems technique can provide one or more of the following advantages: reducing the amount of time required for finding a missing file by efficiently recovering the missing file when the missing file is moved to the parent directory of the missing file, preventing loss of user data by reconstructing a path from the root directory of a file system to a file upon detecting that the path to the file has been lost or corrupted, and preventing unavailability of user data by efficiently recovering files of a file system.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG.

2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of a variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
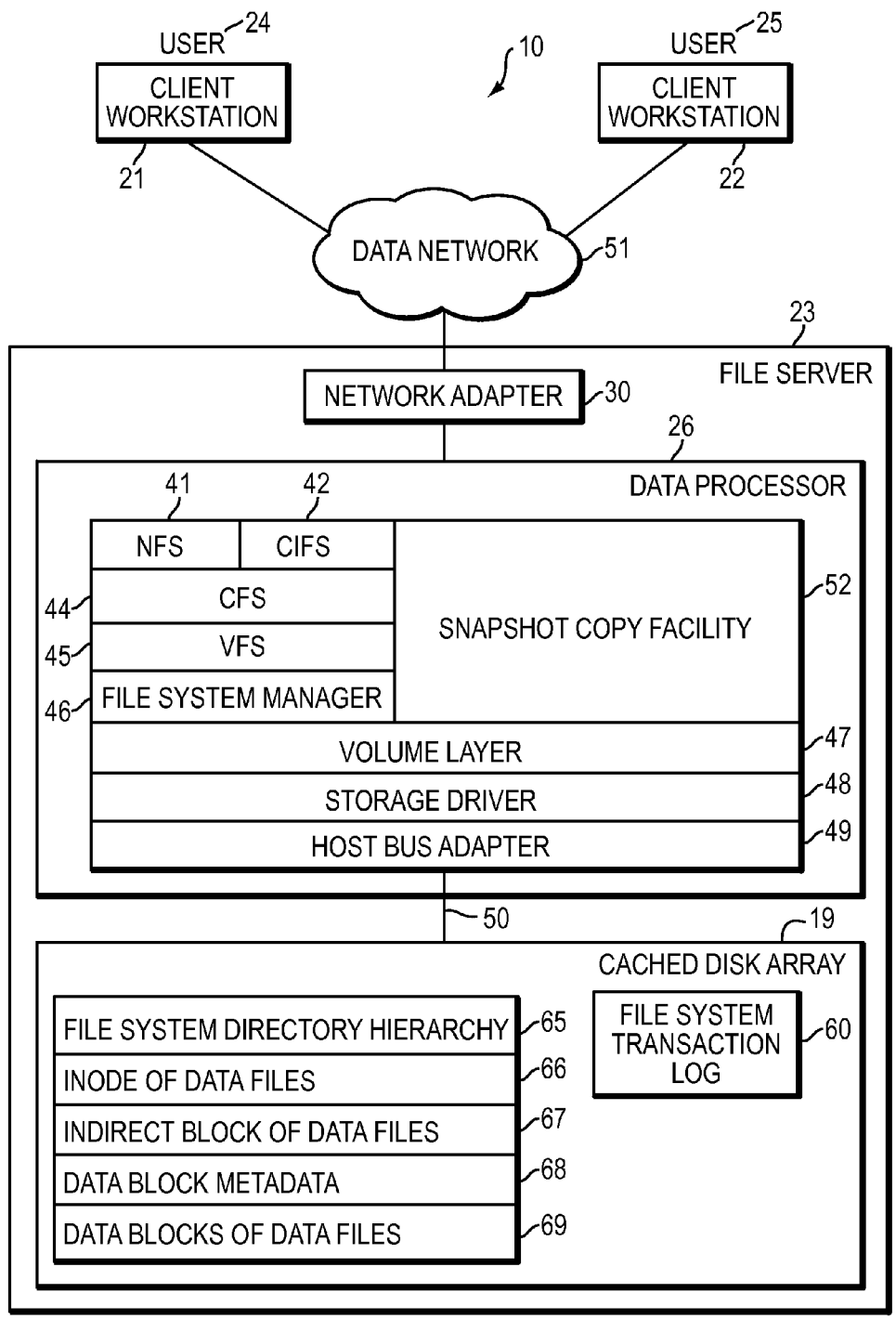

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 7 and 8. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60.

Figure 3:
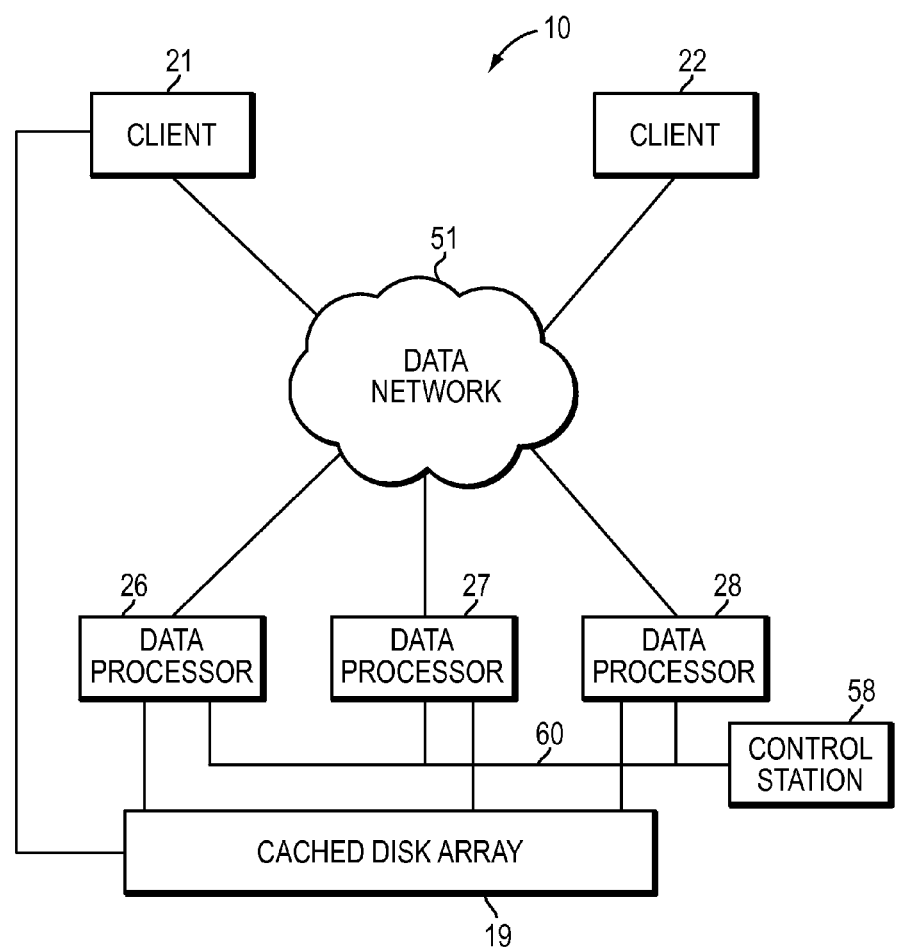

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 4:
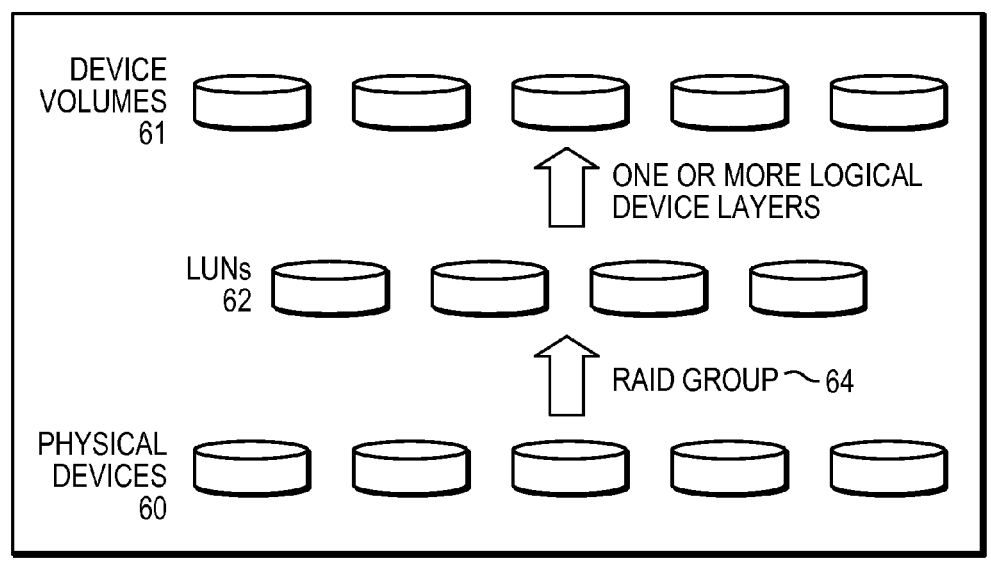
FIGS. 4-12 are diagrams illustrating in more detail components that may be used in connection with techniques herein.

FIG. 4 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

The data storage system 12 may also include one or more mapped devices. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61*a*-61*b*, which are logical devices that map logical storage space of the data device to physical storage space on the physical devices 60*a*-60*b*. Thus, an access of the logical storage space of the mapped device results in either a null pointer (or equivalent) indicating that no corresponding physical storage space has yet been allocated, or results in a reference to a data device which in turn references the underlying physical storage space. Further, a mapped logical unit (also referred to herein as "mapped LUN") may be mapped to a file system.

Figure 5:
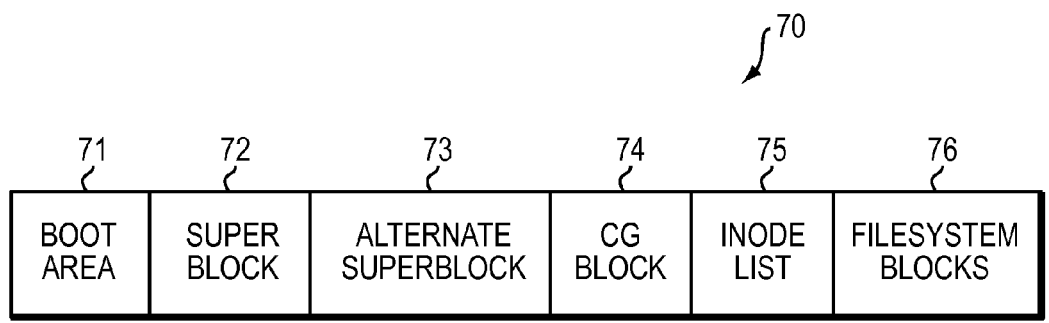

Referring to FIG. 5, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Figure 6:
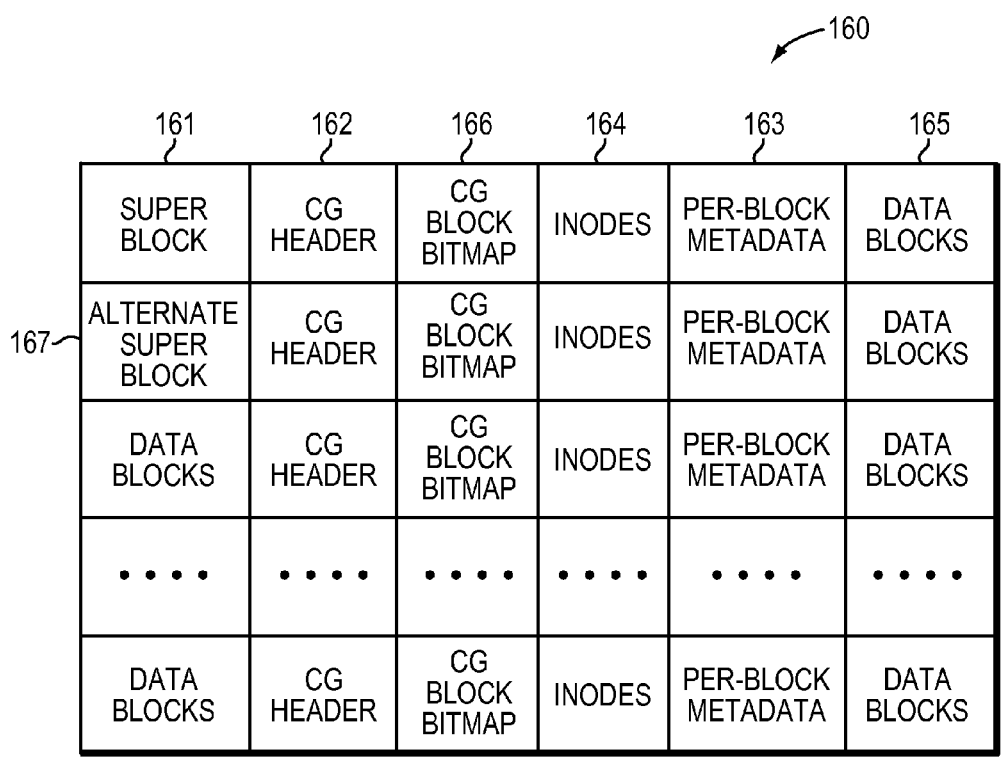

Referring to FIG. 6, shown is a memory map of a logical extent of a file system that may be included in an embodiment using the techniques herein. A logical extent of the file system is subdivided into self-contained cylinder groups. Each cylinder group is of fixed size, such that the size of the cylinder group is the granularity of storage provisioning for the file system. For example, if the file system block size is 8 kilobytes (KB), size of the file system is 4 gigabyte (GB) and size of the cylinder group is 64 megabytes (MB), the file system may include sixty four cylinder group entries, and each cylinder group entry may include 8192 file system blocks. A part of each cylinder group contains metadata of the file system. Other part of each cylinder group contains user's data that is stored in one or more data blocks. Further, each cylinder group includes metadata information that includes a redundant copy of the super-block of a file system, inodes of files of the file system, a bit map describing available blocks in the cylinder group, and information describing the usage of data blocks within the cylinder group. With reference to FIG. 6, each cylinder group (CG) of the file system 160 is a respective row in this memory map. A first cylinder group of the file system 160 indicated by first row of the memory map contains a superblock 161 of the file system, a cylinder group header 162, file system blocks for per-block metadata (BMD) 163 for storing metadata of file system blocks in the cylinder group, inodes 164 of files of file system 160, file system data blocks 165 for the cylinder group, and a cylinder group block bitmap 166 indicating whether or not each file system block in the cylinder group is allocated or not. A second cylinder group of the file system 160 indicated by second row of the memory map has the same format as the first cylinder group. The alternate superblock 167 of the second cylinder group is a copy of the superblock 161 of the first cylinder group. Other cylinder groups have the same format except they do not have a superblock. A file system block can be in one of three states: allocated, free, or reserved. A reserved file system block cannot be allocated or freed. The allocated/free state of a file system block is tracked in the cylinder group block bitmap. Each cylinder group maintains a per-block metadata (BMD) for all file system blocks that it owns. The file system 160 populates the per-block block metadata as and when a file system block is allocated—either for an indirect block or any other metadata block. The per-block metadata 163 is not directly accessible to a network client, and instead it is implicitly accessed in the process of a file system operation that makes use of the cylinder group or file system block contents. For example, the process of allocating or freeing a block of the cylinder group validates and updates block metadata owner state. It should be noted that the memory map of a cylinder group may include other fields (not shown in the FIG. 6) that may be included in a file system stored in data storage system 10.

Figure 7:
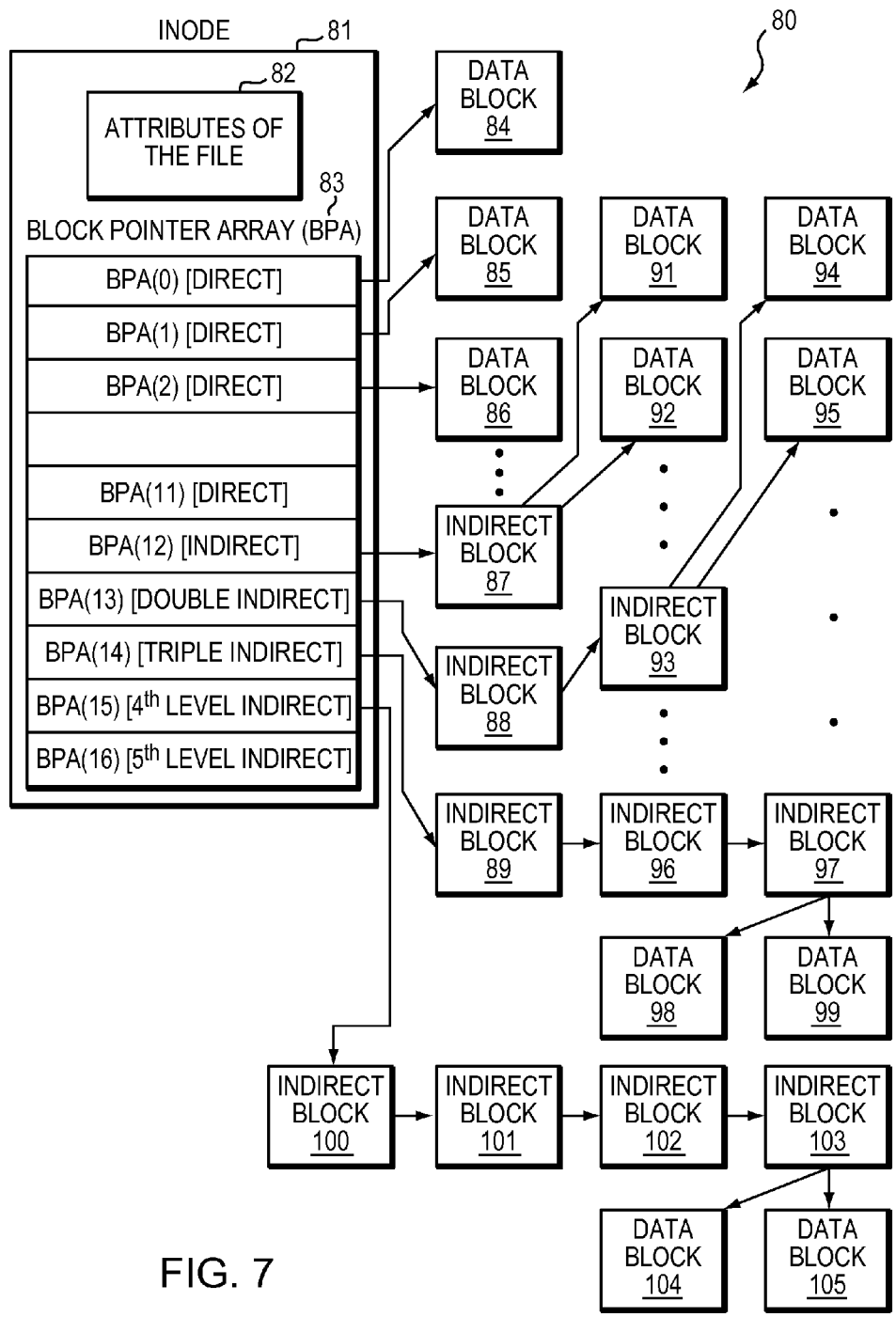

Referring to FIG. 7, shown is a representation of an inode of a file and a file system block tree hierarchy of the file that may be included in an embodiment using the techniques described herein. A file includes an inode 81 containing attributes 82 (such as atime and mtime) of the file, and a block pointer array 83. The block pointer array 83 has seventeen block pointer array entries BPA(0) to BPA(14). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 96 that points to an indirect block 97 that points to one or more additional data blocks (e.g., 98, 99). Similarly the file may include fourth (BPA(15)) and fifth (BPA(16)) level of indirections indicated by indirect blocks 100-103 and data blocks 104-105.

Figure 8:
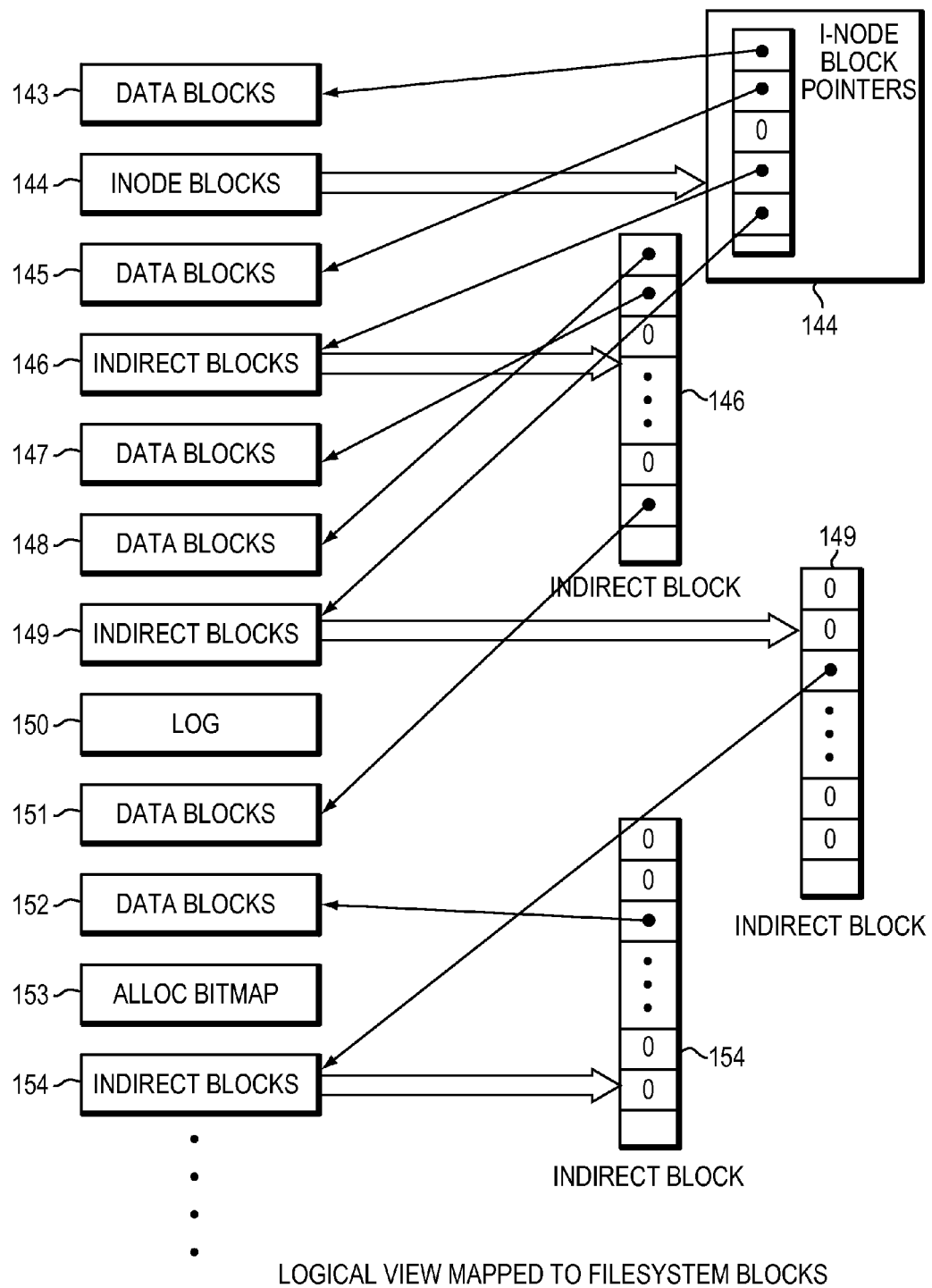

Referring to FIG. 8, shown is a logical and a corresponding physical representation of a file system depicting a standard hierarchical UNIX-based file system using an indirect mapping protocol that may be included in an embodiment using the techniques herein. A file system includes one or more file system blocks. Some of the file system blocks are data blocks 143, 145, 147, 148, 151 and 152, some file system blocks may be indirect block 146, 149 and 154 as described below, or some file system blocks are free blocks that have not yet been allocated to any file in the file system. The first of up to twelve entries of block pointers in the inode 144 directly point to the first of up to twelve data blocks 143, 145, etc. of the file. If the file contains more than twelve data blocks, then the thirteenth entry of the block pointer array 144 contains an indirect block pointer pointing to an indirect block 146 containing pointers to one or more additional data blocks 147, 148, 151, etc. If the file contains so many data blocks that the indirect block 146 becomes full of block pointers, then the fourteenth entry of the block pointer array 144 contains a double indirect block pointer to an indirect block 146 that itself points to an indirect block 149 that points to one or more additional data blocks 152, etc. If the file is so large that the indirect block 149 becomes full of block pointers and its descendant indirect blocks are also full of block pointers, then the fifteenth entry of the block pointer array 144 includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Log 150 provides transactional semantics to a file system and minimizes number of metadata I/Os by logging updates to metadata of the filesystem in the log 150. Allocation bitmap 153 tracks which file system blocks are free in a file system. An entry indicating a value zero in an indirect block represents unallocated regions of a File or a LUN.

Figure 9:
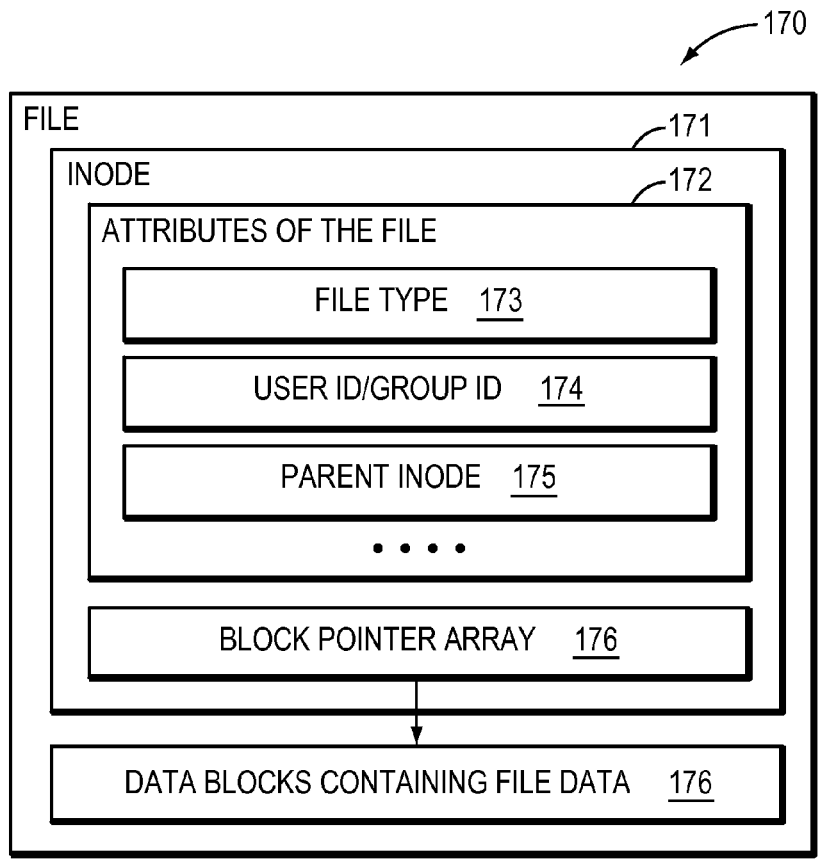

Referring to FIG. 9, shown is a representation of a file that may be included in an embodiment using the techniques described herein. The file 170 includes an inode 171, which includes file attributes 172 and a block pointer array 176. The file attributes 172 include a file type 173, and a user ID or group ID 174, a parent inode 175 which points to the parent directory in which the file inode information resides such that the file may be reached via a path from the parent directory to the file. Thus, the parent inode provides addressing information for addressing the record of one hard link to the regular file 170. The block pointer array 176 includes a block pointer pointing to a data block 60 containing file data 177.

The preferred form of hard link addressing information is the parent inode number 175 of a parent directory that stores one hard link to the file 170. This hard link address information 175 provides a way of finding one hard link to the file 170 without a full search of a file system to find a parent directory followed by a full search of the parent directory to find the entry of this hard link. Instead, one name for the file 170 is found in the parent directory having the parent inode number.

Figure 10:
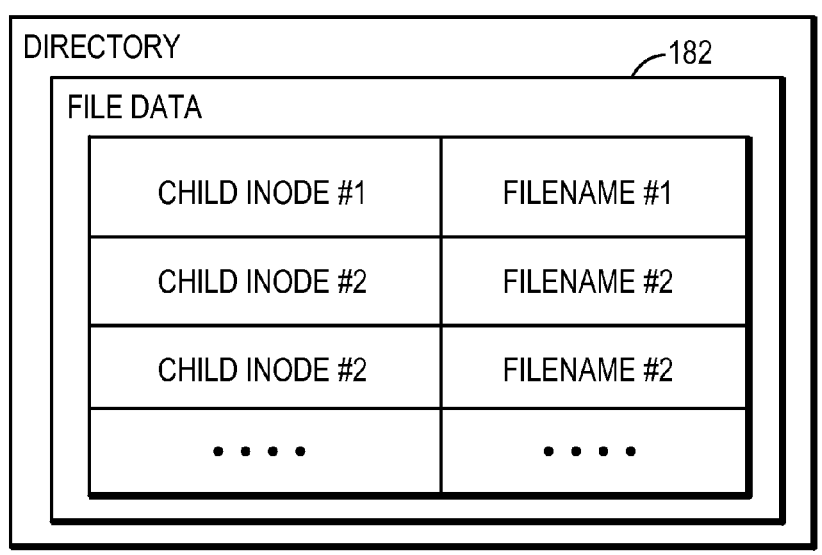

Referring to FIG. 10, shown is a representation of a directory that may be included in an embodiment using the techniques described herein. The directory 180 is a special type of file maintained by the file system manager (46 in FIG. 2). The directory 180 includes file data 182 in the form of a list of records. Each of the records includes a child inode number and a filename character string. The filename character string includes the file name of a hard link from the directory 180 to a file specified by the child inode number.

Figure 11:
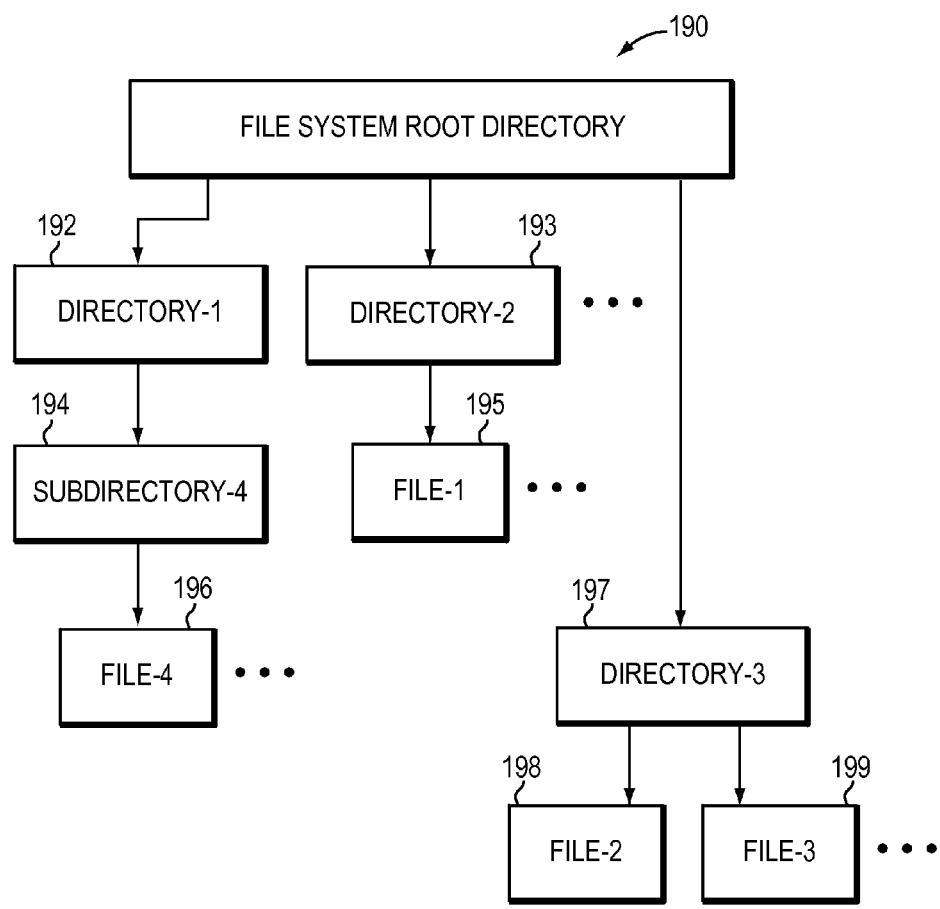

Referring to FIG. 11, shown is a representation of a file system hierarchy of a file system that may be included in an embodiment using the techniques described herein. A file system includes a file system root directory 190, multiple subdirectories 192, 193, 194, 197, and multiple regular files 195, 196, 198, 199. The regular files are "leaf nodes" at the bottom of the file system hierarchy. Each subdirectory 192, 193, 194, 197 has one hard link to it from a parent directory, and each regular file has one or more hard links to it from one or more parent directories. Each hard link has a file name. Because a regular file may have more than one hard link to it, the file name of a hard link to the regular file is not an attribute of the regular file. The file name and a child inode number of the regular file are stored in a corresponding entry of the parent directory. For example, file-4 196 may be reached from the file system root directory 190 using directory-1 192 and subdirectory-4 194. Subdirectory-4 194 is the parent directory for file-4 196 and directory-1 192 is the parent directory for subdirectory-4 194. The file system root directory is the parent directory for directory-1 192, directory-2 193 and directory-3 197. Similarly, the file-2 198 can be reached by accessing directory-3 197 of the file system root directory 190 and then accessing the file inode for file-3 198 from the directory inode for directory-3 197.

Figure 12:
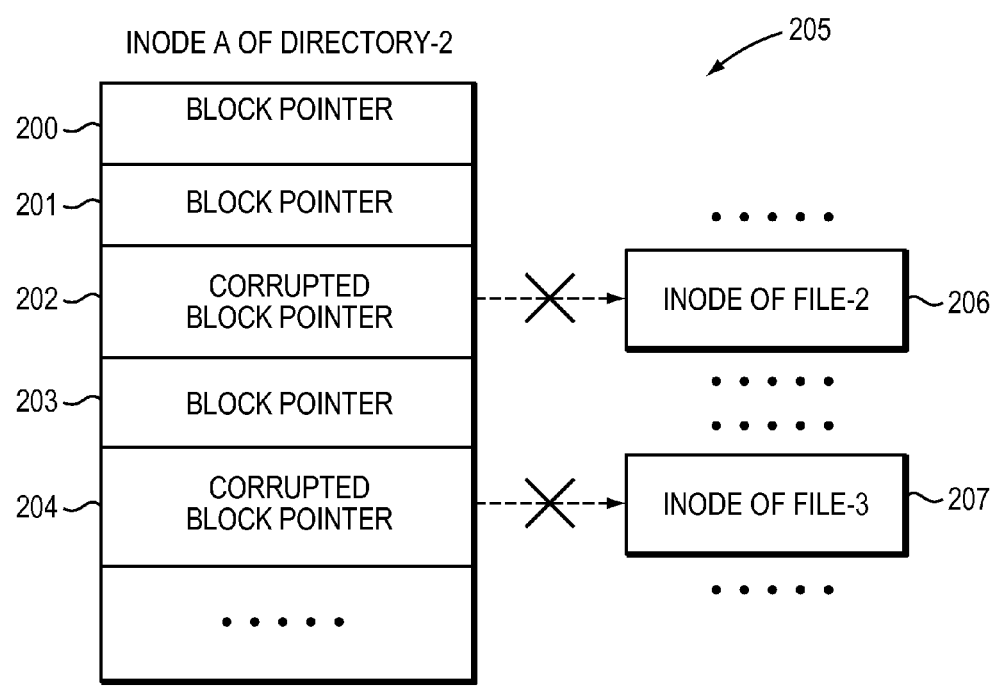

FIG. 12 illustrates an example file system block hierarchy of a directory (e.g., directory-3 197 of FIG. 11) represented by inode "A" 205. The inode A 205 includes block pointers 200-204 that refers to inodes of a set of files organized under the directory 197. Metadata of the directory 197 may be corrupted such that contents of some of the block pointers (e.g., 202, 204) may be lost or corrupted. Thus, in the example shown in FIG. 12, files (e.g., file-2 198, file-3 199) may be inaccessible from respective parent directories as a link to respective inodes 206, 207 for the files become broken because of corruption in the directory inode 205. Thus, in such a case the path to file-2 206 becomes unreachable and thus the inode 206 is referred to as the orphan inode. It should be noted that if file-2 includes more than one hard link indicating that the file-2 may be reachable via more than one path, the file-2 in such a case is not considered a lost file. In such a case, if one hard link of a file is lost, the file continues to be reachable using other hard links. Similarly, if file-3 207 cannot be reached via any path, the inode 207 is referred to as the orphan inode. It should be noted that a directory block can include more than one directory entries, so a block within a directory entry pointing to a specific file may be lost or corrupted.

Figure 13:
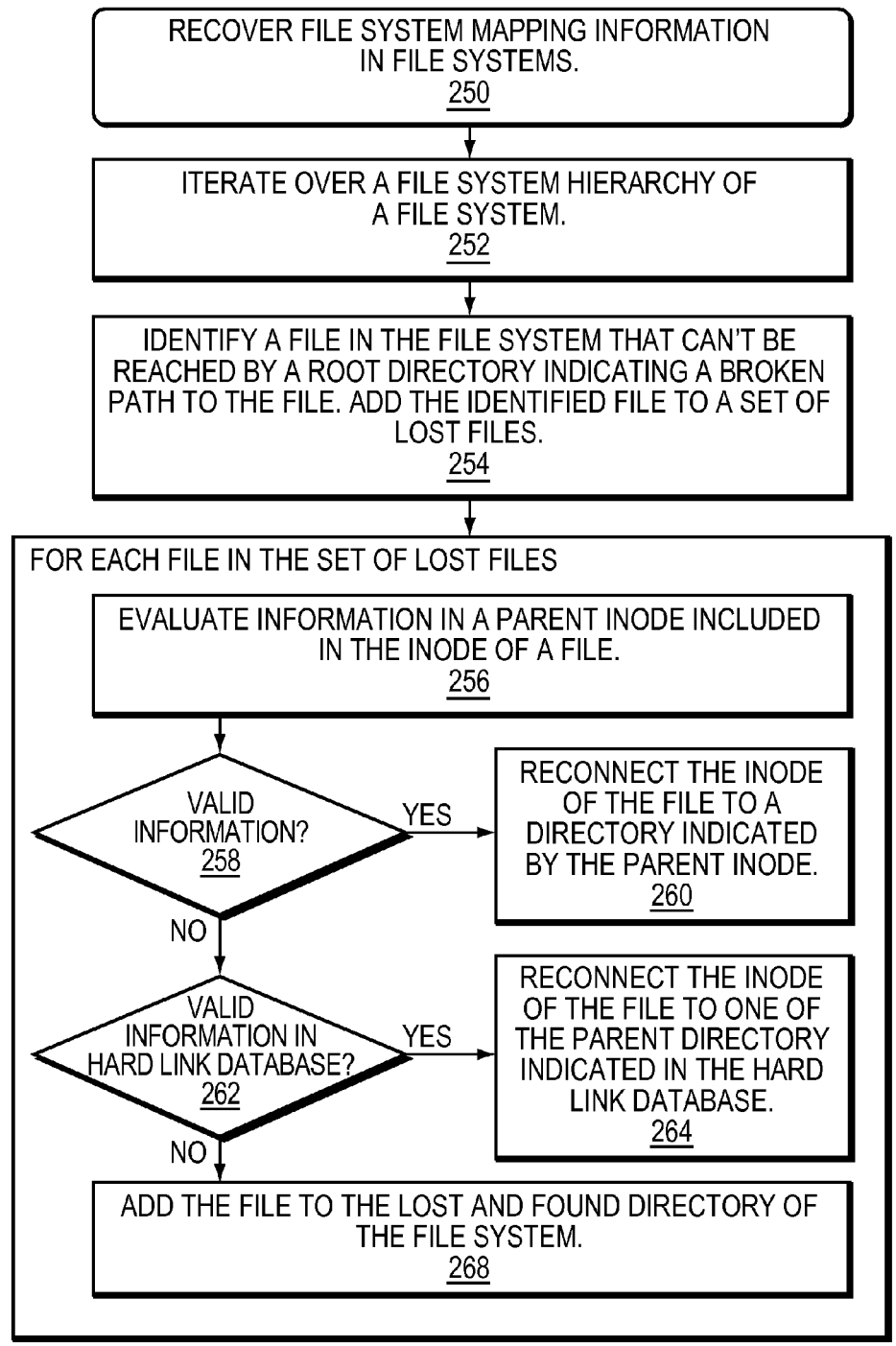
FIG. 13 is a flow diagram illustrating processes that may be used in connection with techniques herein.

Referring to FIG. 13, shown is a flow diagram illustrating the method of recovering file mapping information in file systems. With reference also to FIGS. 1-12, in at least one embodiment of the current technique, during the first phase of the FSCK utility, the FSCK utility iterates over a file system block hierarchy of each inode of a file system and validates block pointers of each inode of the file system. The FSCK utility creates metadata structures for gathering and storing information required for recovering files of the file system. The information may include information regarding which file system blocks are free and which file system blocks are allocated, which references of a file system block have been verified and which references of a file system block have not been verified. It should be noted that the information may be stored in memory, on a storage device or a swap space organized on a storage device. Further, the FSCK utility maintains information regarding how many references for a file system block has been found by evaluating per block metadata of the file system block and a mapping pointer associated with the file system block. Further, the FSCK utility maintains information regarding whether an inode is completely or partially corrupted. The FSCK utility performs a name space check during one of the phases of execution of the FSCK utility in which the FSCK utility evaluates a path to each file of a file system hierarchy. A bitmap is created in which information for each inode of a file system is stored. Each time the FSCK utility finds a path to the inode of a file, a bit associated with the inode in the bitmap is cleared indicating that the path to the file has been found. When each inode of a file system hierarchy has been evaluated, bits are set in the bitmap for inodes for which no path has been found due to metadata corruption in directory inodes. Thus, inodes for which bits are set in the bitmap are referred to as orphan inodes.

In at least one embodiment of the current technique, during the second phase of the execution of FSCK utility, the FSCK utility attempts to reconnect an orphan inode found during the name space check phase of the FSCK utility to a parent directory. The FSCK utility evaluates parent inode information for each file inode for which no path from the root directory has been found and determines whether the parent inode information in the file inode includes the parent inode for the parent directory in which the file inode has been originally organized. Further, in such a case, if the parent inode includes valid information, the FSCK utility determines the parent directory with which the orphan inode may be reconnected to. Further, the FSCK utility maps a top level inode to its parent directory first if needed and iterates over a sub tree block hierarchy of the top level inode for mapping an orphan inode of a file to the parent inode of the file. Thus, in at least one embodiment of the current technique, for each inode that has been determined as a lost or orphan inode, the FSCK utility evaluates a parent inode of the lost or orphan inode and determines whether the lost or orphan inode may be reconnected to the parent inode based on information included in the parent inode.

In at least one embodiment of the current technique, file mapping information of files is recovered in file systems (step 250). The FSCK utility iterates over a file system hierarchy of a file system (step 252). A set of files of the file system is identified where each file of the set of the files has been identified as a lost file because the file cannot be reached via any path (step 254). For each file in the set of files identified as lost files, information in a parent inode included in the inode of the file is evaluated (step 256). A determination is made as to whether the parent inode of the file includes valid information (step 258). Upon determining that the parent inode includes valid information, the inode of the file is reconnected to the directory indicated by the parent inode such that the file is moved to the directory (step 260). However, if the parent inode does not include valid information, a determination is made as to whether a hard link database associated with the file includes valid information (step 262). Upon determining that the hard link database includes valid information, the inode of the file is reconnected to the directory indicated by one of the hard links included in the hard link database such that the file is moved to one of the parent directories (step 264). However, if the hard link database does not include valid information, the file is moved to the lost+found directory of the file system (step 268).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in recovering file mapping information in file systems, the method comprising:

iterating over a file system hierarchy of a file system for evaluating an inode of each file of the file system hierarchy, wherein the file system hierarchy includes a root directory; determining, for each file of the file system hierarchy, whether a path to a file of a file system from the root directory exists in the file system hierarchy, wherein the files of the file system have been organized in the file system hierarchy;

based on the determination that a path to a file from the root directory no longer exists, adding the file to a set of lost files, wherein a parent directory of the file includes a missing reference to an inode of the file in mapping information associating the file to the file system hierarchy of the file system indicating that the path to the file from the root directory no longer exists; and based on the determination, for each lost file of the set of lost files, re-establishing a respective path to a lost file of the set of lost files in the file system hierarchy by using metadata of the lost file, wherein the metadata of the lost file includes a parent inode, the parent inode indicating a parent directory under which the lost file has been organized previously, wherein the lost file is reconnected to the parent directory upon determining that the parent inode includes valid information, wherein the mapping information of the parent directory is updated to include a reference to an inode of the lost file.

2. The method of claim 1, wherein the file of the file system is associated with an inode, wherein the file includes a set of file system blocks organized in a file system block hierarchy, wherein a file system block includes a data block and an indirect block.

3. The method of claim 1, wherein the mapping information associating the file to the file system hierarchy includes a reference to an inode of the file from a parent directory.

4. The method of claim 1, wherein a directory inode of a directory includes metadata regarding a set of files residing under the directory in the file system hierarchy, wherein the metadata includes a reference to an inode of a file of the set of files.

5. The method of claim 1, wherein including the file to the file system hierarchy includes moving the file to a parent directory in which the file has been organized.

6. The method of claim 1, evaluating an inode of each file of the file system hierarchy further comprising:

determining whether a path to the inode of the file exists from a root directory of the file system hierarchy; and based on the determination, adding the file to a set of lost files.

7. The method of claim 6, further comprising:

evaluating a parent inode of each file of the set of lost files; and based on the evaluation, moving the file to a parent directory associated with the parent inode of a file of the set of lost files.

8. The method of claim 1, further comprising:

evaluating a hard link data base for updating the mapping information for including the file to the file system hierarchy; and based on the evaluation, selecting a reference of a parent directory for moving the file to the parent directory.

9. A system for use in recovering file mapping information in file systems, the system comprising a processor configured to:

iterate over a file system hierarchy of a file system for evaluating an inode of each file of the file system hierarchy, wherein the file system hierarchy includes a root directory;

determine, for each file of the file system hierarchy, whether a path to a file of a file system from the root directory exists in the file system hierarchy, wherein the files of the file system have been organized in the file system hierarchy;

based on the determination that a path to a file from the root directory no longer exists, add the file to a set of lost files, wherein a parent directory of the file includes a missing reference to an inode of the file in mapping information associating the file to the file system hierarchy of the file system indicating that the path to the file from the root directory no longer exists; and re-establish, for each lost file of the set of lost files, based on the determination, a respective path to a lost file of the set of lost files in the file system hierarchy by using metadata of the lost file, wherein the metadata of the lost file includes a parent inode, the parent inode indicating a parent directory under which the lost file has been organized previously, wherein the lost file is reconnected to the parent directory upon determining that the parent inode includes valid information, wherein the mapping information of the parent directory is updated to include a reference to an inode of the lost file.

10. The system of claim 9, wherein the file of the file system is associated with an inode, wherein the file includes a set of file system blocks organized in a file system block hierarchy, wherein a file system block includes a data block and an indirect block.

11. The system of claim 9, wherein the mapping information associating the file to the file system hierarchy includes a reference to an inode of the file from a parent directory.

12. The system of claim 9, wherein a directory inode of a directory includes metadata regarding a set of files residing under the directory in the file system hierarchy, wherein the metadata includes a reference to an inode of a file of the set of files.

13. The system of claim 9, wherein including the file to the file system hierarchy includes moving the file to a parent directory in which the file has been organized.

14. The system of claim 9, evaluating an inode of each file of the file system hierarchy further comprising:
determine whether a path to the inode of the file exists from a root directory of the file system hierarchy; and
add, based on the determination, the file to a set of lost files.

15. The system of claim 14, further comprising:
evaluate a parent inode of each file of the set of lost files; and
move, based on the evaluation, the file to a parent directory associated with the parent inode of a file of the set of lost files.

16. The system of claim 9, further comprising:
evaluate a hard link data base for updating the mapping information for including the file to the file system hierarchy; and
select, based on the evaluation, a reference of a parent directory for moving the file to the parent directory.

* * * * *